United States Patent
Ganjikunta et al.

(10) Patent No.: US 12,255,996 B2
(45) Date of Patent: Mar. 18, 2025

(54) IPSEC REKEY

(71) Applicant: Arista Networks, Inc., Santa Clara, CA (US)

(72) Inventors: Sreedhar Ganjikunta, Cupertino, CA (US); Priyesh Vakayil Palakandy, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 349 days.

(21) Appl. No.: 17/716,466

(22) Filed: Apr. 8, 2022

(65) Prior Publication Data
US 2023/0327871 A1   Oct. 12, 2023

(51) Int. Cl.
*H04L 9/00* (2022.01)
*H04L 9/08* (2006.01)
*H04L 9/40* (2022.01)

(52) U.S. Cl.
CPC .......... *H04L 9/0891* (2013.01); *H04L 63/164* (2013.01)

(58) Field of Classification Search
CPC .......................... H04L 9/0891; H04L 63/164
See application file for complete search history.

(56) References Cited

U.S. PATENT DOCUMENTS

| | | | |
|---|---|---|---|
| 10,498,529 B1* | 12/2019 | Hashmi | H04L 9/0618 |
| 2017/0054628 A1* | 2/2017 | Tomotaki | H04L 12/4633 |
| 2021/0273799 A1* | 9/2021 | Kampati | H04L 63/029 |
| 2022/0021687 A1* | 1/2022 | Bhattacharya | H04L 63/1416 |
| 2022/0191141 A1* | 6/2022 | Duraj | H04L 9/0838 |

FOREIGN PATENT DOCUMENTS

WO    WO-2009018510 A1 *  2/2009  .......... H04L 63/061

* cited by examiner

*Primary Examiner* — Kevin Ayala
(74) *Attorney, Agent, or Firm* — Fountainhead Law Group, PC

(57) ABSTRACT

Security Association (SA) rekeying between two endpoints of a network, is achieved without resorting to a central entity and a separate key management protocol. A packet sent from a first peer to a second peer is modified to add extra data to signal the rekey procedure, and to include cryptographic material to provide a new common keying material, which will be used to create new SAs. Since the rekey procedure is a multi-stage procedure, the peers are assigned (initiator/responder) roles in order to transition from one stage to another. Rekeying may be initiated by a timer present at one of the peers. Embodiments allow network peers to autonomously rekey without the help of a central controller, and each peer can rekey with only N−1 of its peers.

19 Claims, 7 Drawing Sheets

IPSEC REKEY

BACKGROUND

A Security Association (SA) is a relationship between two or more entities of a network. The SA describes how the entities will use security services to communicate securely, e.g., using encryption, integrity (checksum), and/or authenticity.

In a SA deployment, a key management protocol may be used to create and periodically refresh security keys. Such a key management protocol can pose scaling issues when multiple peers exist, and all of them are connected in a full mesh.

An alternative SA approach utilizes a key controller model. There, peers connect to a central controller and generate security keys for peers in the network.

Under either approach, use of the same security keys over a prolonged period of time can give rise to unwanted vulnerabilities in the network. Thus, rather than being re-used indefinitely, encryption and decryption keys are periodically refreshed between network endpoints as part of a rekey process.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
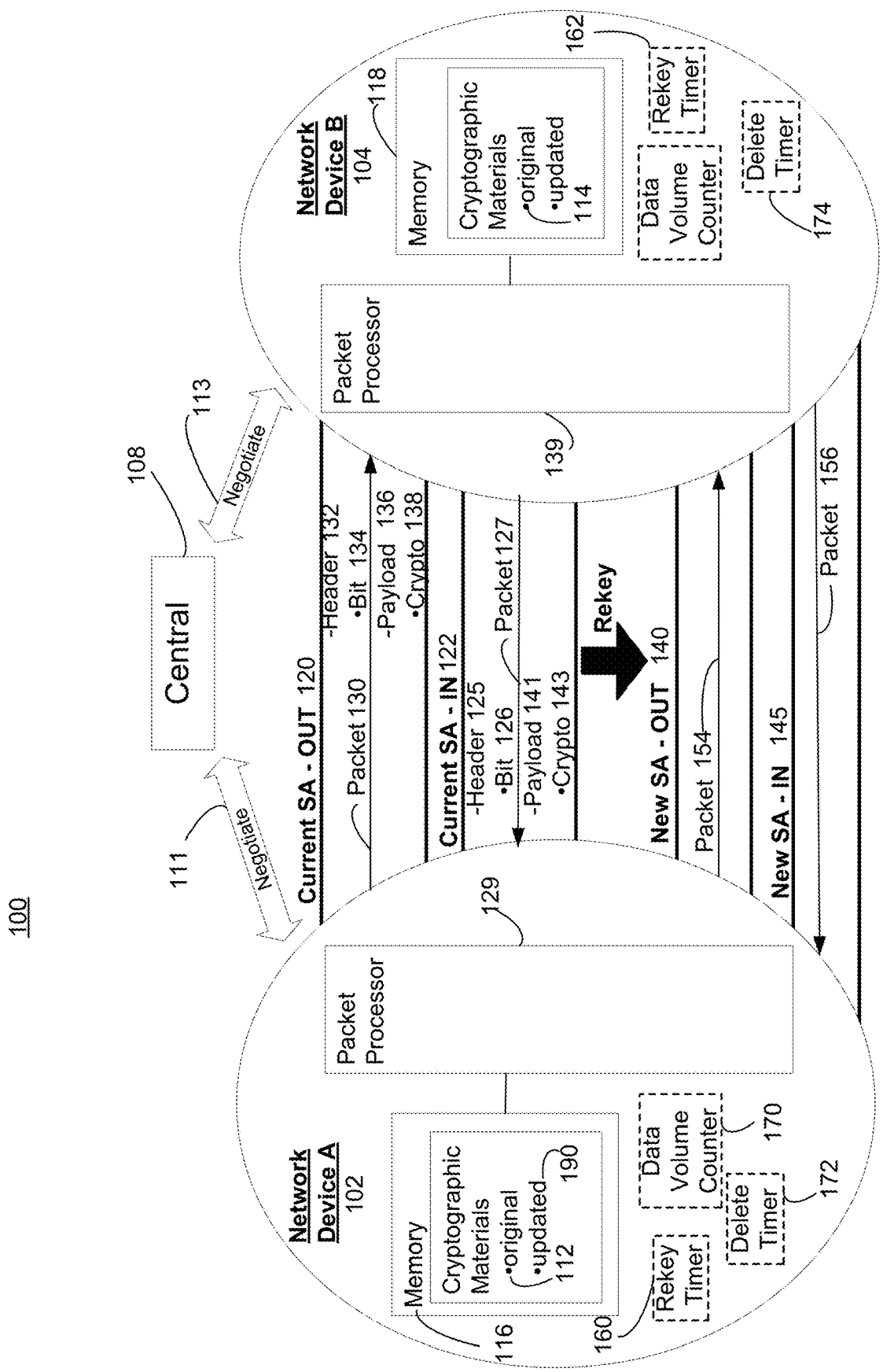
FIG. 1 is a high-level block diagram showing rekeying in a system in accordance with the present disclosure.

FIG. 1 shows a simplified view of a network 100 according to an embodiment. The network comprises a first network device 102 in communication with a second network device 104.

Each of the network devices includes a respective memory 116, 118 for storing information such as cryptographic materials used in creating SAs.

The first network device and the second network device are also in communication with a central entity 108. Initially, the first network device and the second network device engage in negotiation 111, 113 via the central entity, to receive respective original cryptographic materials 112, 114 stored in memories 116, 118.

From the perspective of the first network device, these original cryptographic materials are used to establish current egress (OUT) SA 120 and current ingress (IN) SA 122 with the second network device. The current SAs 120, 122 include security keys for securely encrypting and decrypting of data communicated between the network devices.

Utilization of the same encryption and decryption keys over time, may render the network vulnerable to security attack. Accordingly, the central entity may be configured to periodically re-negotiate all of the devices of the network as part of a global rekeying process according to a key management protocol.

Such a global rekey can, however, be quite consuming of resources (e.g., bandwidth, memory, and/or processing) that are available to the network. Thus, such a global rekeying may not be performed on a frequent basis (e.g., on the order of hours).

Accordingly, in order to improve security, embodiments allow SA rekey between two endpoints of a network, without resorting to a central entity and a separate key management protocol. A packet sent from a first peer to a second peer is modified to add extra data to signal the rekey procedure, and to include cryptographic material to provide a new common keying material, which will be used to create new SAs. Since the rekey procedure is a multi-stage process, the peers are assigned (initiator/responder) roles in order to transition from one stage to another. Rekeying may be initiated by a timer present at one of the peers. Embodiments allow network peers to autonomously rekey without the help of a central controller. Each peer of a group of N peers can rekey with the other N−1 peers of the group.

FIG. 1 thus shows the processor 129 of the first network device sending a first packet 130 to the second network device using the current egress SA. The first packet includes a header 132 and a bit 134 that indicates a rekey process. The first packet also comprises a payload 136 including first cryptographic material 138 from the cryptographic material stored at the first network device.

The second network device receives the first packet using the first current SA. Then, processor 139 of the second network device returns a second packet 127 to the first network device using the second current SA. That second packet comprises a header 125, bit 126, and payload 141 including second cryptographic material 143 stored at the second network device.

By processing the first cryptographic material and the second cryptographic material, the first network device is able to create updated cryptographic material 190 and use the same to generate a new egress SA 140 and a new ingress SA 145 that have new encryption and decryption keys.

Those new SAs are subsequently used to communicate packets 154 and 156 between the first and second network devices in a secure manner. Until such a future time that a further rekey is initiated, those packets will not include the rekey bit in the header.

It is noted that the rekey process is initiated at the first network device independent of the central entity. In some embodiments this initiation may be based upon time, for example expiration of a rekey timer 160 internal to the first network device.

The second network device may also include a separate rekey timer 162. Where that rekey time expires prior to rekey timer 160, rekeying is initiated by the second network device rather than the first network device.

Where the two rekey timers expire at the same time, the packet processor may be configured to perform a resolution operation in order to determine one of the network devices to initiate the rekey. As discussed in detail later below, that resolution operation may be based upon considerations such as the nature of the cryptographic materials and/or addresses of the network devices.

It is noted that embodiments are not limited to the use of time as the criterion for initiating a rekey process. Alternatively, rekeying can be initiated based upon volumes of data that are received, transmitted, or received and transmitted by the first network device. Such data volumes can be sensed by a volume detector 170.

Following rekey, according to embodiments, old SAs may be deleted from the network device (e.g., to conserve memory and/or avoid security exposure). Accordingly, the network devices may further include delete timers 172, 174 to determine when the old SAs are to be deleted from the memories.

Embodiments may offer one or more benefits. One benefit is the ability to implement rekeying directly between network devices without involving a central entity.

This capability can desirably accomplish selective rekeying between particular network devices, for example based upon an internal rekey timer. Such a rekey time can desirably operate on a more frequent basis than the less-frequent (resource-intensive) global network rekeying initiated by a central controller.

Figure 2:
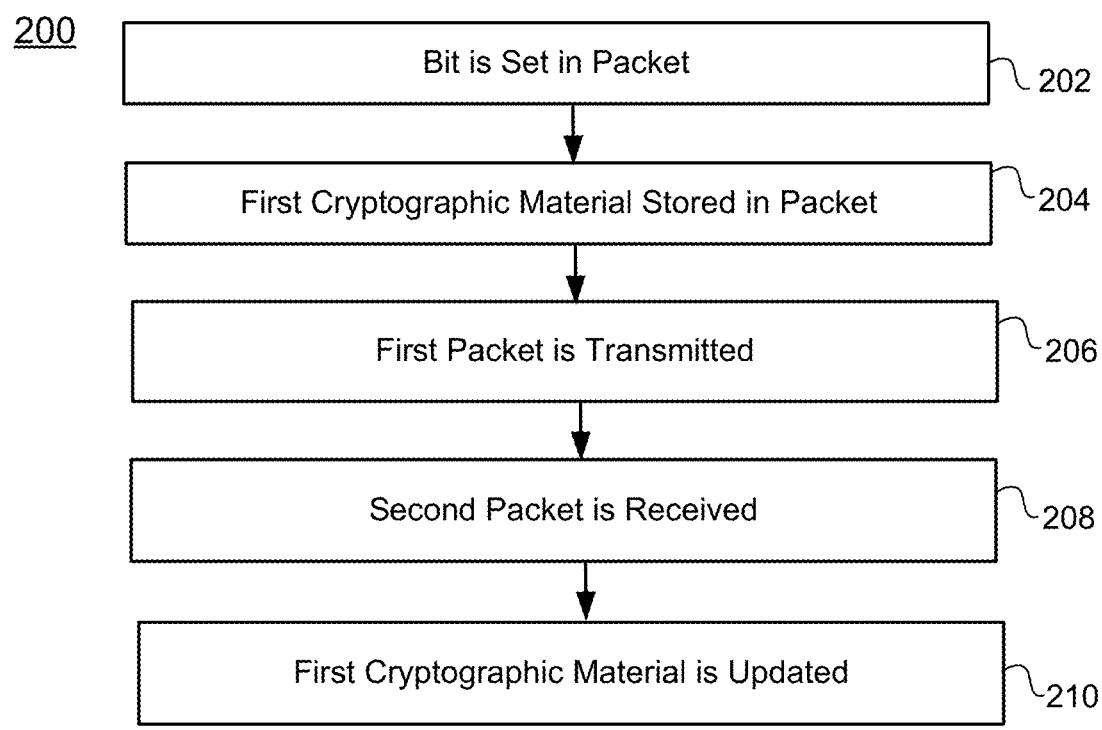
FIG. 2 shows a flow diagram of a SA rekeying method according to an embodiment.

Referring to FIG. 2, the discussion will now turn to a high level description of a flow 200 of a method from the perspective of a first network device for rekeying a first Internet Protocol Security (IPSec) security association (SA) of the first network device, the first IPSec SA including cryptographic material used to respectively encrypt and decrypt transmissions to and from a second network device.

At 202, a bit is set in a Security Protocol Index (SPI) component of a first IPSec packet. At 204, the first cryptographic material is stored in a portion of a payload component of the first IPSec packet.

At 206, the first IPSec packet is transmitted to the second network device. At 208, a second IPSec packet is received from the second network device, with a payload component of the second IPSec including second cryptographic material from the second network device.

At 210, the cryptographic material contained in the first IPSec SA is updated using the first and second cryptographic material. Subsequent transmissions to and from the second network devices, are respectively encrypted and decrypted using the updated cryptographic material.

Figure 3:
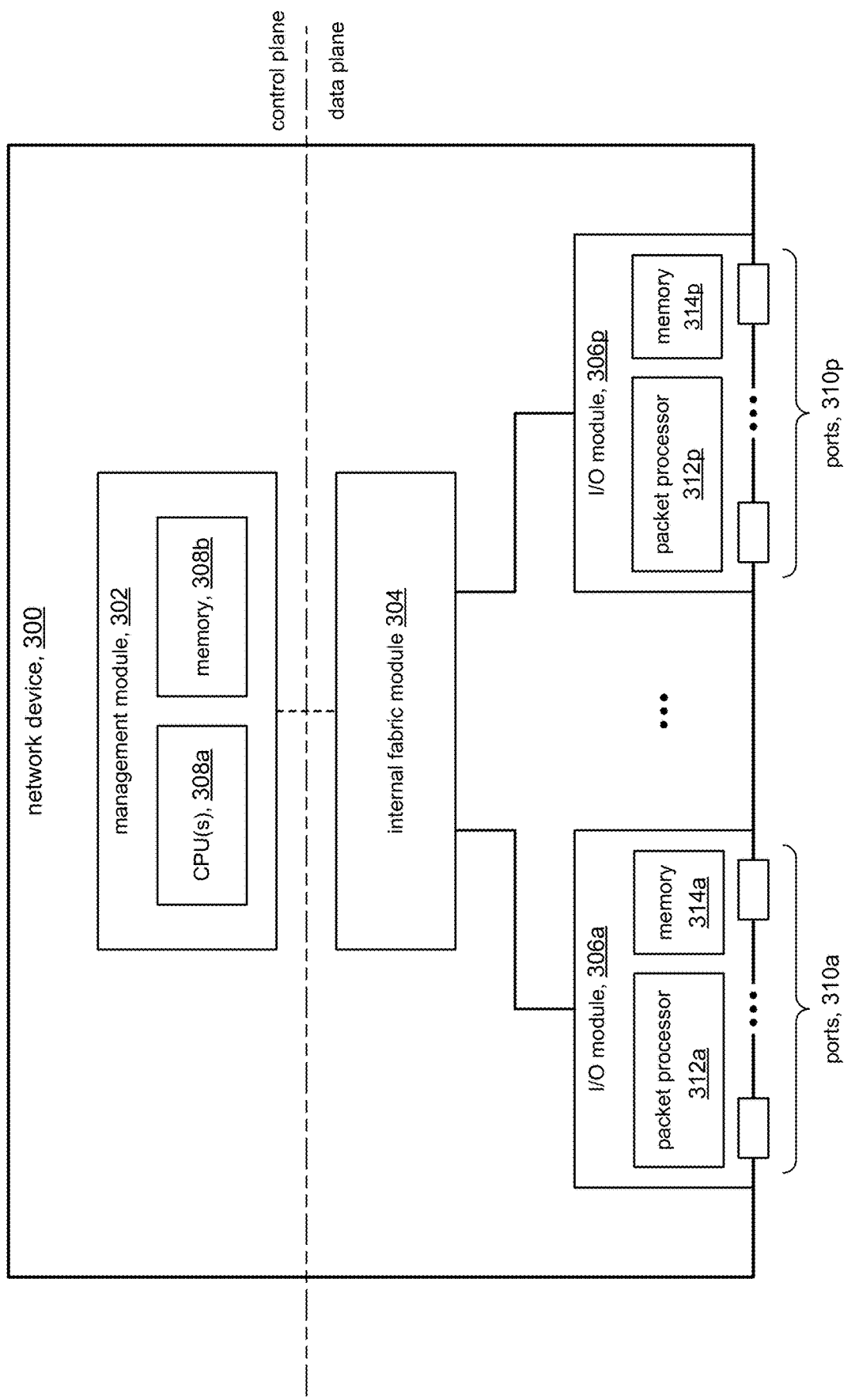
FIG. 3 shows details for a network device as described in the present disclosure.

FIG. 3 depicts an example of a network device 300 (e.g. 102, 104, FIG. 1) in accordance with some embodiments of the present disclosure. As shown, network device 300 includes a management module 302, an internal fabric module 304, and a number of I/O modules 306*a*-306*p*. Management module 302 includes the control plane (also referred to as control layer) of network device 300 and can include one or more management CPUs 308*a* for managing and controlling operation of network device 300 in accordance with the present disclosure. Each management CPU 308*a* can be a general purpose processor, such as but not limited to an Intel®/AMD® x86 or ARM® processor, that operates under the control of software stored in a memory 308*b*, such as dynamic random access memory (DRAM). Control plane refers to all the functions and processes that determine which path to use, such as routing protocols, spanning tree, and the like.

Internal fabric module 304 and I/O modules 306*a*-306*p* collectively represent the data plane of network device 300 (also referred to as data layer, forwarding plane, etc.). Internal fabric module 304 is configured to interconnect the various other modules of network device 300. Each I/O module 306*a*-306*p* includes one or more input/output ports 310*a*-310*p* that are used by network device 300 to send and receive network packets. Each I/O module 306*a*-306*p* can also include a packet processor 312*a*-312*p* and a respective memory component 314*a*-314*p*. Each packet processor 312*a*-312*p* can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments of the present disclosure, the memory components can hold information for rekeying, including but not limited to cryptographic material, timer values, data volume values, and so on.

Example—Auto-VPN IPSec Deployment

An example is now described in connection with IPSec. IPSec is a group of protocols used to set up encrypted connections between two communication points. IPSec works by encrypting IP packets, along with authenticating the source where the packets come from.

The IPSec SA calls for security properties that are recognized by communicating hosts. These hosts typically require two SAs (e.g., ingress, egress) in order to communicate securely. That is, a SA protects data in one direction only. The protection afforded is to either to a single host or a group (multicast) address.

Figure 4:
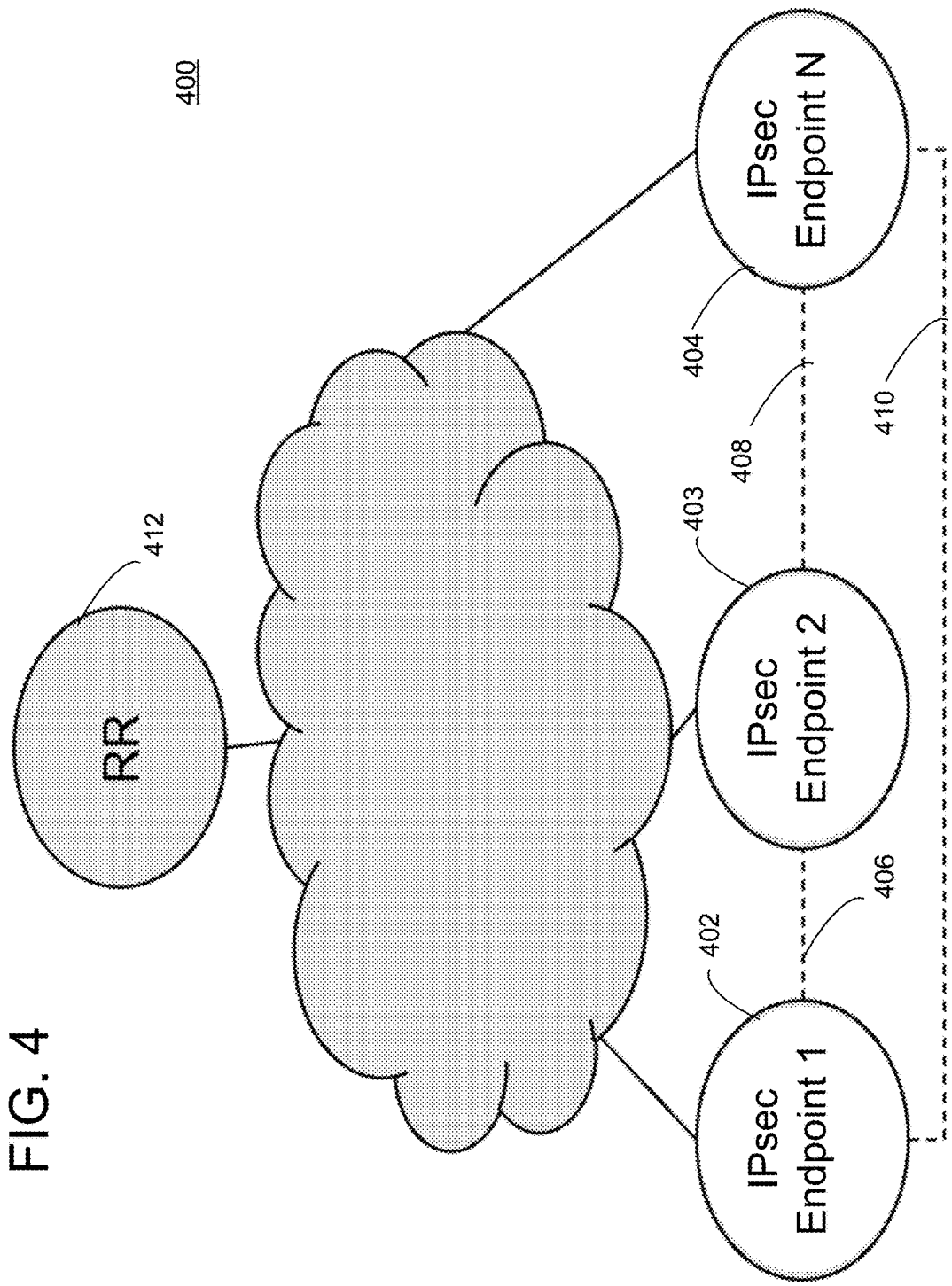
FIG. 4 shows a simplified view of a network according to an example.

An IPSec SA can be part of a Virtual Private Network (VPN) deployment. FIG. 4 shows a simplified view of such a VPN deployment.

In the VPN deployment 400 of FIG. 4, the constituent network devices (IPSec endpoints 402, 403, 404) establish security associations (SAs) 406, 408, 410 between each other by running a key management protocol such as the Internet Key Exchange (IKE) protocol. FIG. 4 shows an auto-VPN deployment where a Route Reflector (RR) 412 serving as a central entity can facilitate establishing the IPSec SAs between the network devices. For example, the network devices can run the protocol through a route reflector to establish and share SA's with each other.

A IPSec SA is unidirectional. Accordingly, FIG. 4 is simplified in that each network device has IN (ingress) SAs to decrypt incoming data from respective devices, and OUT (egress) SAs to encrypt outgoing data to respective devices.

Each IPSec SA is associated with a Security Protocol Index (SPI). The SPI informs the network device as to which SA to use in order to process received data.

In particular, the SPI is part of the IPSec SA. The SPI allows the receiving entity to select the SA with which a received packet will be processed.

In an auto-VPN deployment, each network device exchanges cryptographic information (e.g., Diffie-Hellman generated values, a random number referred to as a "nonce" and other suitable cryptographic material) to create IPSec SAs with the peer network devices through the RR acting as a central entity.

Each network device generates encryption and decryption keys used to encrypt and decrypt communications with other network devices, using the key material from the respective network devices. Using IKE, the network devices communicate with each other via the central entity to renegotiate SAs on a periodic basis (e.g., 8-hour period). As between any two given network devices, however, this periodic refresh rate may not be sufficiently frequent for security purposes.

Thus, in accordance with embodiments, it may be advantageous to have any two network devices (e.g., Device A and Device B) communicate directly with each other (absent the central entity) to perform a rekey of their respective SAs on a more frequent basis without having to use a key management protocol such as IKE.

Figure 5:
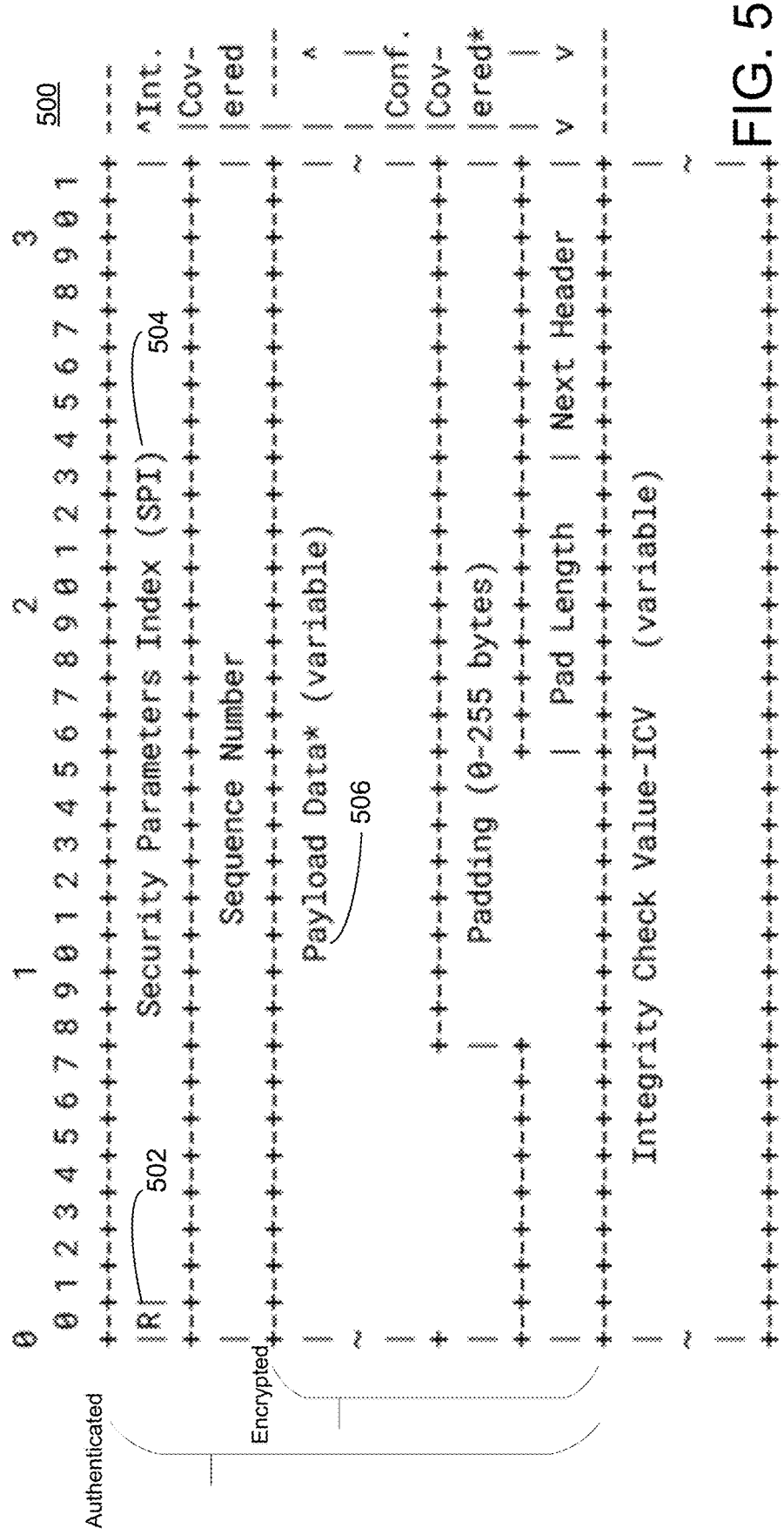
FIG. 5 shows an embodiment of packet according to the example.

FIG. 5 shows an IPSec packet 500 according to an embodiment. The high-order bit 502 in the SPI 504 component of the IPSec packet, is used as a rekey bit to signal a rekey operation according to an embodiment.

The rekey operation can include incorporating an Encapsulating Security Protocol (ESP) extension header in the customer payload portion 506 of the IPSec packet. With this mechanism, the length of the SPI is shortened from 32-bit to 31-bit.

In such an embodiment, the payload data can comprise an Initialization Vector (IV), an ESP extension header (if present) and the inner payload data of the customer.

Figure 6:
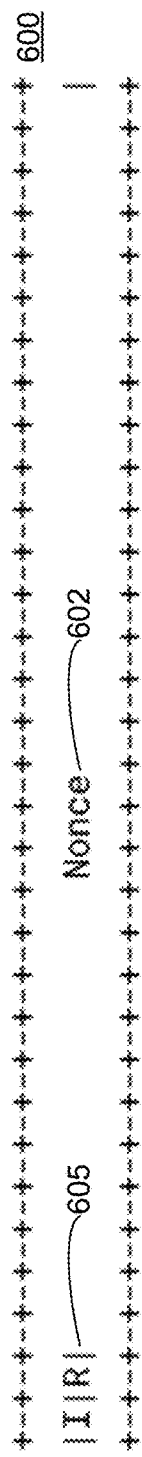
FIG. 6 shows an embodiment of an extension header according to the example.

FIG. 6 shows a view of the ESP extension header 600 according to an exemplary embodiment. The ESP extension header can be the first 32-bits in the customer's payload.

The ESP extension header can be a 32-bit datum that includes a 30-bit nonce 602. Thus according to embodiments, Device A can initiate a rekey of the respective SAs of network devices by setting the rekey bit in the SPI, and incorporating a nonce in the ESP extension header of the customer payload of an outgoing IPSec packet.

For a SA rekey, one bit 502 in the SPI (part of the ESP header) is used to indicate whether an SA rekey is in progress. For the IPsec SA rekey, a nonce 602 is used to introduce randomness to the key generation.

The new extension header is defined to send the nonce and the IR type (Initiator/Responder—who initiated the rekey). The new ESP extension header is 4 bytes in this example. The IR (Initiator/Responder) type 605 is of 2 bits, and the Nonce is 30 bits.

The 4-byte ESP extension header is located at the start of the customer payload and can be encrypted along with the payload. There is, however, no requirement to encrypt the new extension header.

A rekey process according to embodiments can be triggered by any suitable criteria. For example, the rekey criterion can be according to time. Thus in some embodiments a user defined rekey time may be used—e.g., a rekey time period that is shorter than global rekeying implemented through the RR of the VPN deployment.

Alternatively, the criterion for performing a rekey according to an embodiment, can be based on the amount of data that is communicated (transmitted, received, or some combination thereof). Such data volumes can be measured in packets, bytes, or other metrics.

Figure 7:
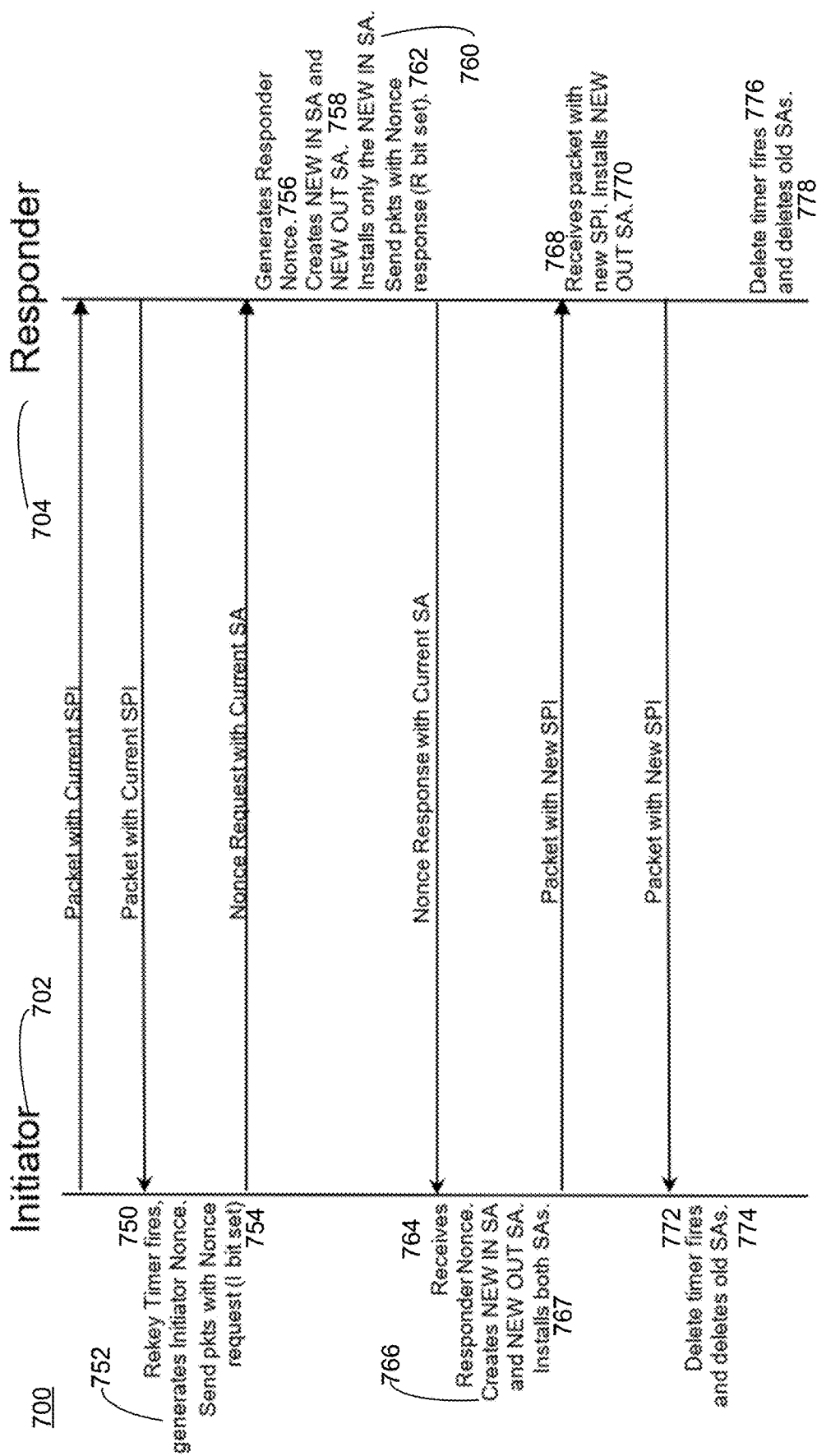
FIG. 7 shows a simplified flow diagram of one embodiment of a rekey process.

FIG. 7 shows a flow diagram illustrating a particular rekeying process 700 between initiator 702 and responder 704 that is based upon a time period. That time period is determined from a rekey timer located at the initiator.

Upon receiving the IPSec packet at the responder, the rekey bit signals the responder that a rekey operation has begun. The responder can generate its nonce and create a new IN SA using that nonce and the initiator's nonce in the ESP extension header of the payload.

The responder can set the rekey bit and store its nonce in an ESP extension header in the payload of the next outgoing packet to the initiator.

When the initiator sees the rekey bit in an incoming packet, the initiator can create a new IN SA and a new OUT SA.

The initiator can generate a new SPI to inform the responder that the initiator has installed the IN SA in order to decrypt data from the responder.

When the responder sees the new SPI, it can create and install a new OUT SA for communicating with the initiator thereafter. It is noted that the ESP extension header is added to the data packet only during the rekey. Once the rekey procedure is finished, the ESP extension header is no longer part of the data packet.

Further details regarding the rekeying process of FIG. 7 are now described. When the rekey timer fires at 750, the control plane of the initiator generates a nonce 752 and notifies the data plane of the rekey in progress.

The initiator data plane sends 754 packets with the rekey bit set, and the nonce type as NONCE_REQUEST.

The packet arrives at the data plane of the responder with the rekey bit set. The data plane notifies the control plane of the responder, of the nonce and nonce type of the initiator.

The control plane of the responder generates 756 a new nonce and creates 758 NEW IN SA and NEW OUT SA. The control plane of the responder installs 760 new IN SA in the data plane of the responder.

The responder data plane installs NEW IN SA and updates the control plane.

The responder control plane notifies the data plane of a rekey in progress.

The responder data plane sends 762 a packet with the responder nonce and the nonce type set as NONCE_RESPONSE.

The packet is received 764 at the initiator data plane with rekey bit set. The initiator data plane notifies the control plane of nonce and nonce type.

The initiator control plane creates 766 NEW IN SA and NEW OUT SA. The initiator control plane installs 767 both in the initiator data plane.

The initiator data plane informs the initiator control plane that NEW SAs have been installed. The initiator data plane thereafter sends packets to the responder with the NEW SPI.

The responder data plane notifies the responder control plane that the packet was received 768 with new SPI. The control plane of the responder installs 770 a NEW OUT SA in the dataplane.

The responder data plane sends a packet with NEW SPI.

Next, the delete time of the control plane of the initiator fires 772 to delete old SAs from the data plane. The initiator data plane then correspondingly deletes 774 the old SAs.

Lastly, the delete time of the control plane of the responder fires 776 to delete old SAs from the data plane. The responder data plane then correspondingly deletes 778 the old SAs.

The flow of FIG. 7 shows the rekey timer of a first network device expiring first in order to establish that device as an initiator. Sometimes, however, the rekey timers of two network devices could concurrently signal a rekey.

Under those circumstances, rekeying according to embodiments may still be performed further utilizing a resolution operation. The resolution operation determines which network device is considered to be the initiator for purposes of the rekeying procedure, and which network device is considered to be the responder.

According to some embodiments, the resolution operation could be based upon the nonce value. In a particular embodiment, the network device with the higher nonce value can be deemed to be the initiator. Nonce is a random 30-bit value that is generated by IPsec endpoints. For example, (where 0x indicates hex numbers) 0x03456789 is greater than 0x02345678.

Alternatively, the resolution could be based upon criteria separate from or in addition to nonce value. Thus in certain approaches, the network device having a higher IP address could be deemed to be the initiator for purposes of the rekeying according to an embodiment. The IP address can be a 4 byte(32-bit) or 16 bytes(128-bit) value. For example, the IP address 192.168.1.100, is greater than the IP address 192.168.1.1.

Figure 8:
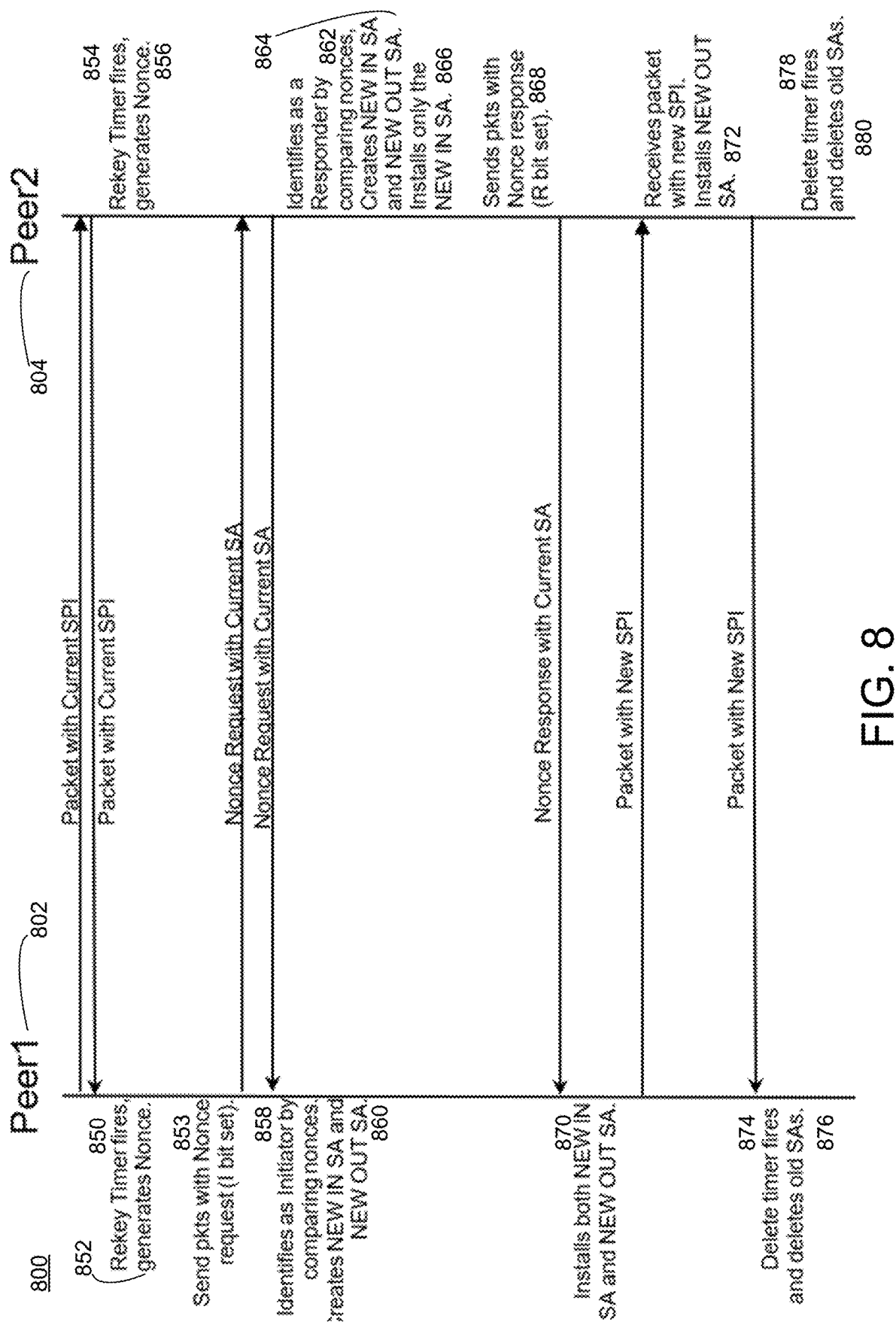
FIG. 8 shows a simplified flow diagram of another embodiment of a rekey process.

FIG. 8 shows a simplified view of a flow of a concurrent rekeying procedure 800 between a Peer1 802 and a Peer2 804. Here, when Peer1's rekey timer fires 850, a nonce is generated 852 and the data plane is notified of a rekey in progress. Peer1's data plane sends 853 packets with the rekey bit set and the nonce type as NONCE_REQUEST.

For Peer2, when the rekey timer fires 854 at the same time as Peer1's, a nonce is generated 856 and the data plane is notified of a rekey in progress. Peer2's data plane sends packets with the rekey bit set and the nonce type as NONCE_REQUEST.

The packet sent by Peer2 arrives on Peer1's data plane with the rekey bit set. Peer1 notifies the control plane of the nonce and nonce type. Peer1's control plane recognizes that a simultaneous rekey is in progress. It is noted that both IPSec endpoints can recognize that a simultaneous rekey is in progress.

For purposes of resolution, Peer1 recognizes 858 that its generated nonce is greater than Peer2's nonce. Accordingly, Peer1 marks itself as the Initiator. Peer 1 creates 860 NEW IN SA and NEW OUT SA.

Packet arrives on Peer2's data plane with the rekey bit set. Peer2 notifies the control plane of the nonce and nonce type Peer2's control plane recognizes that a simultaneous rekey is in progress.

Peer2 recognizes 862 that Peer1's generated nonce is greater than Peer2's nonce. Accordingly, Peer2 marks itself as the Responder.

Peer2 creates 864 NEW IN SA and NEW OUT SA, and installs 866 the NEW IN SA.

Peer2's data plane sends 868 packets with responder nonce type set as NONCE_RESPONSE.

Peer1's data plane notifies Peer1's control plane of NONCE_RESPONSE. Peer1's control plane installs 870 NEW IN SA and NEW OUT SA.

Peer1's data plane sends packets with NEW OUT SA SPI.

Peer2's data plane notifies its control plane of the arrival of packets with NEW OUT SA SPI. Peer2's control plane installs 872 NEW OUT SA in the DP Peer2's data plane sends packet with NEW OUT SA.

In Peer1's control plane, the delete timer fires 874 to delete 876 old SAs from the data plane. Peer1's data plane correspondingly deletes old SAs.

In Peer2's control plane, the delete time fires to delete old SAs from the data plane. Peer2's data plane correspondingly deletes old SAs.

Further Examples

In accordance with the present disclosure, a method in a first network device comprises rekeying a first IPSec security association (SA) of the first network device, the first IPSec SA including first cryptographic material used to respectively encrypt and decrypt transmissions to and from a second network device, the method in the first network device comprises setting a bit in a SPI component of a first IPSec packet; storing the first cryptographic material in a portion of a payload component of the first IPSec packet; transmitting the first IPSec packet to the second network device; receiving a second IPSec packet from the second network device, wherein a payload component of the second IPSec includes second cryptographic material from the second network device; and updating the cryptographic material contained in the first IPSec SA using the first and second cryptographic material, wherein subsequent transmissions to and from the second network devices are respectively encrypted and decrypted using the updated cryptographic material.

In some embodiments, the first cryptographic material is stored in a first area of the payload component of the first IPSec packet, wherein client data is stored in a remaining area of the payload component of the first IPSec packet.

In some embodiments, the method further comprises the first network device negotiating with a plurality of network devices that includes the second network device to initialize a plurality of IPSec SAs in the first network device used to communicate with respective network devices among the plurality of network devices, wherein rekeying the first IPSec SA is performed subsequent to the negotiating.

In some embodiments, the first network device negotiates with the plurality of network devices via a central entity using a key management protocol, wherein rekeying the first IPSec SA is performed directly with the second network device without using the key management protocol.

In some embodiments, the method further comprises initiating rekeying of the first IPSec SA in response to expiration of a timer.

In some embodiments, the method further comprises storing the updated cryptographic material in a new IPSec SA separate from the first IPSec SA and subsequently deleting the first IPSec SA.

In some embodiments, the method further comprises resolving, between the first network device and the second network device which network device is a rekey initiator and which network device is a rekey responder.

In accordance with the present disclosure, a network device comprises one or more computer processors; and a computer-readable storage medium comprising instructions for controlling the one or more computer processors to rekey a first IPSec security association (SA) of a first network device, the first IPSec SA including first cryptographic material used to respectively encrypt and decrypt transmissions to and from a second network device, the instructions instructing the first network device to: set a bit in a SPI component of a first IPSec packet; store the first cryptographic material in a portion of a payload component of the first IPSec packet; transmit the first IPSec packet to the second network device; receive a second IPSec packet from the second network device, wherein a payload component of the second IPSec includes second cryptographic material from the second network device; and update the cryptographic material contained in the first IPSec SA using the first and second cryptographic material, wherein subsequent transmissions to and from the second network devices are respectively encrypted and decrypted using the updated cryptographic material, the first network device negotiating with a plurality of network devices that includes the second network device to initialize a plurality of IPSec SAs in the first network device used to communicate with respective network devices among the plurality of network devices, wherein rekeying the first IPSec SA is performed subsequent to the negotiating.

In some embodiments the first network device negotiates with the plurality of network devices via a central entity using a key management protocol, wherein rekeying the first IPSec SA is performed directly with the second network device without using the key management protocol.

In some embodiments of a network device, the first cryptographic material is stored in a first area of the payload component of the first IPSec packet, wherein client data is stored in a remaining area of the payload component of the first IPSec packet.

In some embodiments of a network device, rekeying of the first IPSec SA is in response to expiration of a timer.

In some embodiments of a network device, rekeying of the first IPSec SA is in response to a data volume.

In some embodiments of a network device, the instructions further instruct storing the updated cryptographic material in a new IPSec SA separate from the first IPSec SA and subsequently deleting the first IPSec SA.

In some embodiments of a network device, the instructions further instruct resolving, between the first network device and the second network device which network device is a rekey initiator and which network device is a rekey responder.

In accordance with the present disclosure, a method comprises a first network device setting a bit in a component of a first packet; the first network device storing first cryptographic material in a portion of a payload component of the first packet; the first network device transmitting the first packet to the second network device using a first Security Association (SA); receiving a second packet from the second network device using a second security association, wherein a payload component of the second packet includes second cryptographic material from the second network device; and updating the cryptographic material contained in the first network device using the first and second cryptographic material, wherein subsequent transmission from the first network device to the second network device is encrypted and decrypted using updated cryptographic material of a third SA.

In some embodiments, the first SA comprises an IPSec SA.

In some embodiments, setting the bit is initiated based upon expiration of a timer in the first network device.

In some embodiments, setting the bit is initiated based upon a data volume detected in the first network device.

In some embodiments, the method further comprises the first network device negotiating with the second network device using a central entity to generate the first cryptographic material, wherein setting the bit is performed subsequent to the negotiating.

In some embodiments, the central entity comprises a route reflector

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a first network device for rekeying a first Internet Protocol Security (IPSec) security association (SA) of the first network device, the first IPSec SA including first cryptographic material used to respectively encrypt and decrypt transmissions to and from a second network device, the method in the first network device comprising:
   setting a single bit in a Security Protocol Index (SPI) component of a first IPSec packet to a value indicating that an SA rekey operation is in progress between the first network device and the second network device;
   storing the first cryptographic material in a portion of a payload component of the first IPSec packet;
   transmitting the first IPSec packet to the second network device;
   receiving a second IPSec packet from the second network device, wherein an SPI component of the second IPsec packet has the single bit set to the value indicating that the SA rekey operation is in progress, and wherein a payload component of the second IPSec packet includes second cryptographic material from the second network device; and
   updating the cryptographic material contained in the first IPSec SA using the first and second cryptographic material and storing the updated cryptographic material in one or more new IPsec SAs, wherein subsequent transmissions to and from the second network device are respectively encrypted and decrypted using the one or more new IPsec SAs.

2. The method of claim 1, wherein the first cryptographic material is stored in a first area of the payload component of the first IPSec packet, wherein client data is stored in a remaining area of the payload component of the first IPSec packet.

3. The method of claim 1, further comprising the first network device negotiating with a plurality of network devices that includes the second network device to initialize a plurality of IPSec SAs in the first network device used to communicate with respective network devices among the plurality of network devices, wherein rekeying the first IPSec SA is performed subsequent to the negotiating.

4. The method of claim 1, wherein the first network device negotiates with the plurality of network devices via a central entity using a key management protocol, wherein rekeying the first IPSec SA is performed directly with the second network device without using the key management protocol.

5. The method of claim 1, further comprising initiating rekeying of the first IPSec SA in response to expiration of a timer.

6. The method of claim 1, further deleting the first IPSec SA after storing the updated cryptographic material in the one or more new IPSec SAs.

7. The method of claim 1, further comprising resolving, between the first network device and the second network device which network device is a rekey initiator and which network device is a rekey responder.

8. The method of claim 7, wherein the resolving compares nonce values or compares IP address values.

9. A network device comprising:
one or more computer processors; and
a computer memory comprising instructions for controlling the one or more computer processors to rekey a first Internet Protocol Security (IPSec) security association (SA) of the network device, the first IPSec SA including first cryptographic material used to respectively encrypt and decrypt transmissions to and from a second network device, the instructions instructing the network device to:
set a single bit in a Security Protocol Index (SPI) component of a first IPSec packet to a value indicating that an SA rekey operation is in progress between the network device and the second network device;
store the first cryptographic material in a portion of a payload component of the first IPSec packet;
transmit the first IPSec packet to the second network device;
receive a second IPSec packet from the second network device, wherein an SPI component of the second IPsec packet has the single bit set to the value indicating that the SA rekey operation is in progress, and wherein a payload component of the second IPSec packet includes second cryptographic material from the second network device; and
update the cryptographic material contained in the first IPSec SA using the first and second cryptographic material and storing the updated cryptographic material in one or more new IPSec SAs, wherein subsequent transmissions to and from the second network device are respectively encrypted and decrypted using the one or more new IPSec SAs,
the network device negotiating with a plurality of network devices that includes the second network device via a central entity using a key management protocol, to initialize a plurality of IPSec SAs in the network device used to communicate with respective network devices among the plurality of network devices,
wherein rekeying the first IPSec SA is performed subsequent to the negotiating, and
wherein rekeying the first IPSec SA is performed directly with the second network device without using the key management protocol.

10. The network device of claim 9, wherein the computer-readable storage medium further comprise instructions for deleting an initial IPSec SA after the rekeying.

11. The network device of claim 9, wherein the first cryptographic material is stored in a first area of the payload component of the first IPSec packet, wherein client data is stored in a remaining area of the payload component of the first IPSec packet.

12. The network device of claim 9, wherein rekeying of the first IPSec SA is in response to expiration of a timer.

13. The network device of claim 9, wherein rekeying of the first IPSec SA is in response to a data volume value.

14. The network device of claim 9, wherein the instructions further control the one or more computer processors to delete the first IPSec SA after storing the updated cryptographic material in the one or more new IPSec SAs.

15. The network device of claim 9, wherein the instructions further control the one or more computer processors to resolve, between the network device and the second network device which network device is a rekey initiator and which network device is a rekey responder.

16. A method comprising:
a first network device setting a single bit in a component of a first packet to a value indicating that a security association (SA) rekey operation is in progress between the network device and a second network device;
the first network device storing first cryptographic material in a portion of a payload component of the first packet;
the first network device transmitting the first packet to the second network device using a first SA that comprises an Internet Protocol Security (IPSec) SA;
receiving a second packet from the second network device using a second SA, wherein a component of the second packet has the single bit set to the value indicating that the SA rekey operation is in progress, and wherein a payload component of the second packet includes second cryptographic material from the second network device; and
updating the cryptographic material contained in the first network device using the first and second cryptographic material,
wherein subsequent transmission from the first network device to the second network device is encrypted and decrypted using updated cryptographic material of a third SA.

17. The method of claim 16, wherein setting the single bit is initiated based upon expiration of a timer in the first network device or a data volume value detected in the first network device.

18. The method of claim 16, further comprising the first network device negotiating with the second network device using a central entity to generate the first cryptographic material, wherein setting the single bit is performed subsequent to the negotiating.

19. The method of claim 18, wherein the central entity comprises a route reflector.

* * * * *